(12) United States Patent
Park

(10) Patent No.: US 9,669,831 B2
(45) Date of Patent: Jun. 6, 2017

(54) AUTOMATIC DRIVING CONTROLLING SYSTEM AND METHOD

(71) Applicant: Mando Corporation, Pyeongtaek-si, Gyeonggi-do (KR)

(72) Inventor: Man Bok Park, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/864,406

(22) Filed: Sep. 24, 2015

(65) Prior Publication Data

US 2016/0082959 A1    Mar. 24, 2016

(30) Foreign Application Priority Data

Sep. 24, 2014 (KR) ........................ 10-2014-0127377

(51) Int. Cl.
*B60W 30/14* (2006.01)
*G05D 1/00* (2006.01)
*B60W 30/02* (2012.01)
*B60W 30/18* (2012.01)

(52) U.S. Cl.
CPC ............ *B60W 30/14* (2013.01); *B60W 30/02* (2013.01); *B60W 30/18145* (2013.01); *G05D 1/0088* (2013.01); *B60W 2520/10* (2013.01); *B60W 2520/125* (2013.01); *B60W 2520/14* (2013.01); *B60W 2550/146* (2013.01)

(58) Field of Classification Search
None
See application file for complete search history.

(56) References Cited

U.S. PATENT DOCUMENTS

| | | | | |
|---|---|---|---|---|
| 2002/0041229 A1* | 4/2002 | Satoh | ................... | G05D 1/0246 340/438 |
| 2002/0095246 A1* | 7/2002 | Kawazoe | ............. | G05D 1/0246 701/1 |
| 2005/0209766 A1* | 9/2005 | Perisho | .............. | B60K 31/0083 701/96 |
| 2006/0195238 A1* | 8/2006 | Gibson | ................ | A01B 69/008 701/23 |
| 2006/0241833 A1* | 10/2006 | Yasui | .................... | B60W 10/10 701/38 |
| 2008/0077283 A1* | 3/2008 | Ueyama | ................. | G01C 21/26 701/1 |

(Continued)

*Primary Examiner* — Truc M Do
*Assistant Examiner* — Jess Whittington
(74) *Attorney, Agent, or Firm* — McDermott Will & Emery LLP

(57) ABSTRACT

An automatic driving controlling system includes: a speed sensor; and a yaw rate sensor that detects a vehicle yaw rate. A controller is configured: to calculate a target yaw rate required to drive the vehicle to a target point and calculates a real-time target yaw rate by comparing a yaw rate detected in real time with the target yaw rate; to calculate a target lateral acceleration by using a vehicle speed and the target yaw rate, and calculates a real-time target lateral acceleration; and to determine whether the real-time target lateral acceleration-is out of a range between an upper limit threshold value and a lower limit threshold value of the target lateral acceleration while an automatic driving mode is in progress. The controller terminates the automatic driving mode so that the driver takes control of the vehicle to drive.

6 Claims, 5 Drawing Sheets

(56) References Cited

U.S. PATENT DOCUMENTS

| | | | |
|---|---|---|---|
| 2009/0037064 A1* | 2/2009 | Nakamura | B60T 8/1755 701/70 |
| 2010/0191423 A1* | 7/2010 | Koyama | B60W 30/09 701/42 |
| 2010/0222960 A1* | 9/2010 | Oida | B60G 17/0195 701/31.4 |
| 2010/0222965 A1* | 9/2010 | Kimura | B60W 30/025 701/41 |
| 2011/0190985 A1* | 8/2011 | Billberg | B60W 40/10 701/41 |
| 2013/0190985 A1* | 7/2013 | Nakano | B62D 6/00 701/41 |

* cited by examiner

AUTOMATIC DRIVING CONTROLLING SYSTEM AND METHOD

CROSS-REFERENCE TO RELATED APPLICATION

This application claims priority from and the benefit under 35 U.S.C. §119(a) of Korean Patent Application No. 10-2014-0127377, filed on Sep. 24, 2014, which is hereby incorporated by reference for all purposes as if fully set forth herein.

BACKGROUND OF THE INVENTION

1. Field of the Invention

The present invention relates to an automatic driving controlling system and a method thereof, and more particularly, to an automatic driving controlling system that recognizes the driver's intention for the driving control of a vehicle more accurately by using a yaw rate and lateral acceleration while the vehicle is driving in an automatic driving mode to thereby release the automatic driving mode so that the convenience and satisfaction of the driver can be enhanced, and a method thereof.

2. Description of the Prior Art

As the use of cars is rapidly increasing in modern society, the number of dead or injured each year due to car accident amounts to tens of thousands of people. Accordingly, in order to reduce casualties and economic losses caused by traffic accident, a variety of automotive technologies, such as the advanced driver assistance system (ADAS) that adopts state-of-the-art sensors and intelligent video equipment to prevent accidents, have been developed.

The advanced driver assistance system includes forward collision warning (FCW) technology, automatic cruise control (ACC) technology, lane change assistant technology, lane departure warning technology, or parking assistance technology.

Here, the automatic cruise control technology allows a vehicle to automatically detect a preceding vehicle that is driving in the same direction in the driving lane while the vehicle is maintained in the same lane according to the configuration condition of the driver, and to automatically accelerate or decelerate the speed according to the speed of the preceding vehicle to thereby keep a safe distance and automatically drive at a target speed.

While the vehicle is driving in the automatic driving mode using the automatic cruise control technology, if the driver releases the automatic driving mode and changes lanes, that is, if the driver intends to directly drive the vehicle, the driver manipulates the steering wheel. In order to detect the driver's intention for the driving control, in the prior art, the user's manipulation of the steering wheel is detected using a torque signal that is created by a torque sensor. However, in the case where the driver's manipulation is detected using the torque signal, only if the driver applies a considerable force to the steering wheel to be operated, the torque signal is created to be sufficient. Thus, it is not easy to detect the user's manipulation for the steering wheel. In addition, it is difficult to establish clear objective criteria to determine a threshold value of the torque signal, and the threshold value of the torque signal tends to be subjectively determined. Therefore, the method for clearly detecting the driver's intention for the driving control is required.

SUMMARY OF THE INVENTION

The present invention provides an automatic driving controlling system and a method, which detect the driver's intention for the driving control more accurately by using a yaw rate and lateral acceleration while the vehicle is driving in the automatic driving mode to thereby release the automatic driving mode, so that the convenience and satisfaction of the driver can be enhanced.

In accordance with an aspect of the present invention, an automatic driving controlling system may include: a speed sensor that detects a vehicle speed; a yaw rate sensor that detects a yaw rate of the vehicle; a yaw rate calculating unit that calculates a target yaw rate that is required to drive the vehicle to a determined target point and calculates a real-time target yaw rate that is required to drive the vehicle to the target point by comparing a yaw rate that is detected by the yaw rate sensor in real time with the target yaw rate; a lateral acceleration calculating unit that calculates a target lateral acceleration that is required to drive the vehicle to the target point by using the vehicle speed and the target yaw rate, and calculates a real-time target lateral acceleration that is required to drive the vehicle to the target point by using the vehicle speed and the real-time target yaw rate; and a control determination unit that determines whether or not the real-time target lateral acceleration, which is calculated by the lateral acceleration calculating unit, is out of the range between a predetermined upper limit threshold value and a predetermined lower limit threshold value of the lateral acceleration while an automatic driving mode that automatically controls the driving of the vehicle is in progress.

In accordance with another aspect of the present invention, an automatic driving controlling method may include: detecting a vehicle speed; detecting a yaw rate of the vehicle; calculating a target yaw rate that is required to drive the vehicle to a determined target point; calculating a target lateral acceleration that is required to drive the vehicle to the target point by using the vehicle speed and the target yaw rate; controlling the driving of the vehicle according to the target lateral acceleration; calculating a real-time target yaw rate that is required to drive the vehicle to the target point by comparing a yaw rate that is detected in real time with the target yaw rate while an automatic driving mode for automatically controlling the driving of the vehicle is in progress; calculating a real-time target lateral acceleration that is required to drive the vehicle to the target point by using the vehicle speed and the real-time target yaw rate; and determining whether or not the real-time target lateral acceleration is out of the range between a predetermined upper threshold value and a predetermined lower limit threshold value of the lateral acceleration.

In the automatic driving controlling system, according to the present invention, it is possible to more accurately recognize the driver's intention for the driving control by using a real-time target lateral acceleration. Therefore, the driver can release the automatic driving mode at any time the driver desires while an active driving control mode is in progress to thereby enhance the convenience and satisfaction of the driver.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
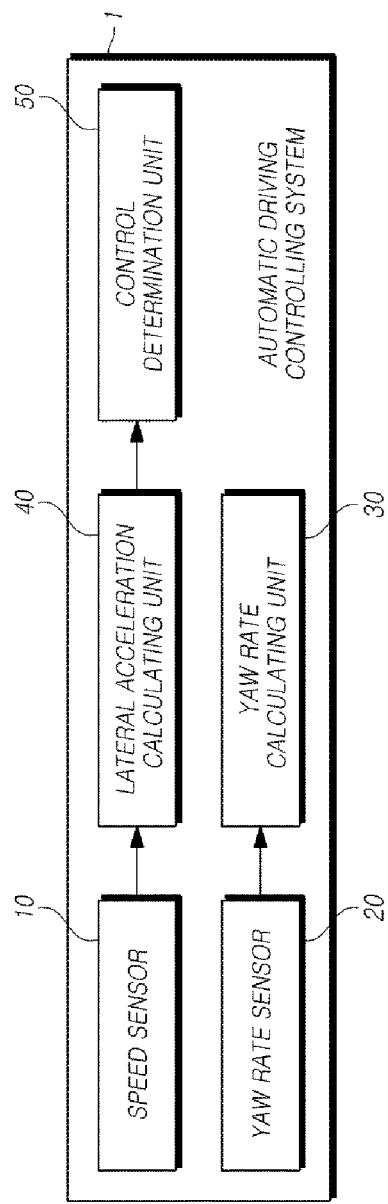
FIG. 1 is a configuration block diagram of an automatic driving controlling system, according to the present invention.

Hereinafter, some embodiments of the present invention will now be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
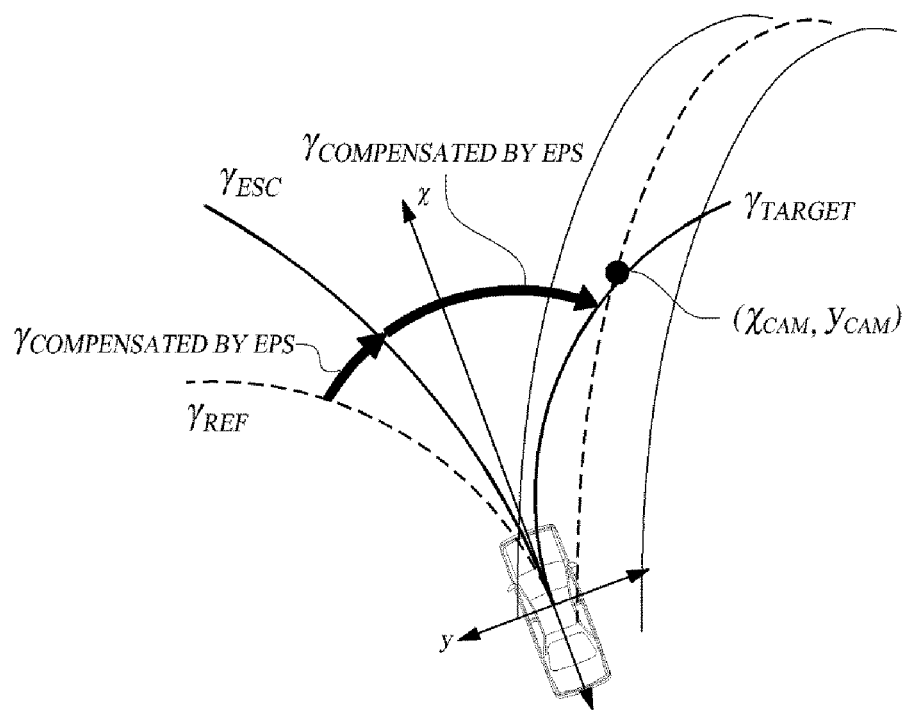
FIG. 2 illustrates an example showing a trajectory of the vehicle and a target yaw rate required to reach the target point from the current position of the vehicle.
Figure 3:
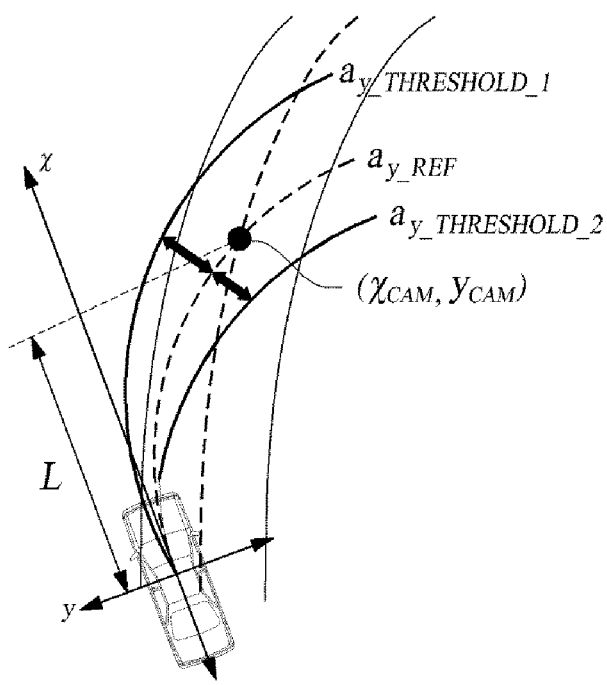
FIG. 3 illustrates an example showing an upper limit threshold value and a lower limit threshold value of the target lateral acceleration calculated in order for the vehicle to reach the target point.
Figure 4:
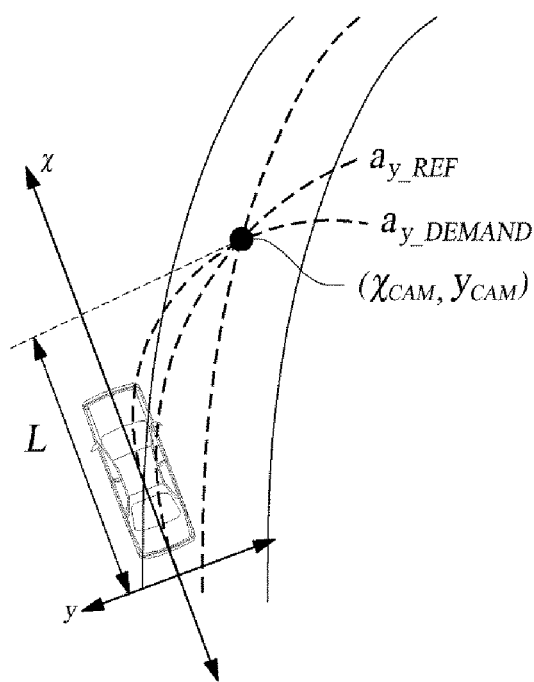
FIG. 4 illustrates an example showing a real-time target yaw rate and a trajectory of the vehicle, which are recalculated in order for the vehicle to reach the target point during the driving of the vehicle.

FIG. 1 is a configuration block diagram of an automatic driving controlling system, according to the present invention, and FIG. 2 illustrates an example showing a trajectory of the vehicle and a target yaw rate in order for the vehicle to reach the target point from the current position of the vehicle. FIG. 3 illustrates an example showing an upper limit threshold value and a lower limit threshold value of the target lateral acceleration calculated in order for the vehicle to reach the target point, and FIG. 4 illustrates an example showing a real-time target yaw rate and a trajectory of the vehicle, which are recalculated in order for the vehicle to reach the target point during the driving of the vehicle.

The automatic driving controlling system 1, according to the present invention, calculates a yaw rate and a lateral acceleration, which are required in order for the vehicle to reach the target point, in real time while the vehicle drives in an automatic driving mode, and if the lateral acceleration is out of a range between a predetermined upper limit threshold value and a lower limit threshold value, determines that the driver intends to control the driving of the vehicle to thereby release the automatic driving mode.

The automatic driving controlling system 1 may include a speed sensor 10 that detects a vehicle speed, a yaw rate sensor 20 that detects a yaw rate, a yaw rate calculating unit 30 that calculates a yaw rate, a lateral acceleration calculating unit 40 that calculates a lateral acceleration by using the vehicle speed and the yaw rate, and a control determination unit 50 that recognizes the driver's intention by using the lateral acceleration in order to thereby control the operation of the automatic driving mode.

The speed sensor 10 may be attached to the driving motor of a transmission, and may create a speed signal according to the rotation angle of the driving motor in order to thereby measure the vehicle speed. The speed sensor 10 may adopt a hall sensor, an optical sensor, a magnetic sensor, or the like. The vehicle speed that is measured by the speed sensor 10 may be provided to the lateral acceleration calculating unit 40.

The yaw rate sensor 20 may detect a yaw rate, i.e., an angular velocity in the vertical-axis direction of the vehicle, and may be comprised of an oscillator and a detector. When an AC voltage is applied to the oscillator of the yaw rate, the oscillator shakes left and right. In such a state, if the vehicle turns at a specific angular velocity, the detector slants in the direction perpendicular to the direction in which the vibration is applied according to Coriolis' force to thereby output an AC voltage. The AC waveform signal generated in the detector is synchronously detected in order to thereby obtain the turning direction and the size thereof, and the detected waveform is output in the analog signal.

The yaw rate sensor 20 may detect a yaw rate that is created by the current driving of the vehicle, that is, a reference yaw rate indicated as $\gamma_{ref}$ in FIG. 2, and may provide the same to the lateral acceleration calculating unit 40.

The yaw rate calculating unit 30 may calculate a target yaw rate $\gamma_{target}$ that is required for driving the vehicle to a predetermined target point. Furthermore, the yaw rate calculating unit 30 may calculate, in real time, a real-time target yaw rate $\gamma_{target}{}^{real\text{-}time}$ that is required in order for the vehicle to reach the target point while the vehicle is heading for the target point. Here, the target point may be a point that is determined in real time in order for the vehicle to travel along the lane during the automatic driving of the vehicle, or may be a point that is arbitrarily determined to return the vehicle back to the lane when the vehicle departs from the lane.

First, when the target point is given as a coordinate value ($x_{CAM}$, $y_{CAM}$) as shown in FIG. 2, the yaw rate calculating unit 30 may calculate the target yaw rate $\gamma_{target}$ that is to be generated in the vehicle when driving the vehicle to the target point.

In addition, the yaw rate calculating unit 30 may receive a yaw rate that is detected in real time from the yaw rate sensor 20 while the vehicle is travelling to the target point, and may calculate the real-time target yaw rate $\gamma_{target}{}^{real\text{-}time}$ that is required in order for the vehicle to reach the target point with respect to the real-time yaw rate. That is, the real-time target yaw rate $\gamma_{target}{}^{real\text{-}time}$ may be a yaw rate that is corrected in order for the vehicle to reach the target point.

The lateral acceleration calculating unit 40 may receive the speed information and the yaw rate information from the speed sensor 10 and the yaw rate calculating unit 30, and may calculate the lateral acceleration.

First, when the target yaw rate $\gamma_{target}$ is calculated and provided from the yaw rate calculating unit 30, the lateral acceleration $a_{y\text{-}ref}$ calculating unit 40 may calculate the target lateral acceleration using Equation 1 below. The target lateral acceleration $a_{y\text{-}ref}$ is the lateral acceleration that occurs over the course of driving the vehicle to the target point through the target yaw rate $\gamma_{target}$.

$$a_{y\text{-}ref} = V_x(\dot{\beta} + \dot{\gamma}_{target}) \quad \text{Equation 1}$$

Here, $a_{y\text{-}ref}$ denotes the target lateral acceleration, and V denotes the vehicle speed in the x-axis direction. $\dot{\gamma}_{target}$ refers to a differential value of the target yaw rate $\gamma_{target}$.

In addition, when the real-time target yaw rate $\gamma_{target}{}^{real\text{-}time}$ is calculated and provided from the yaw rate calculating unit 30 while the vehicle is driving in the automatic mode based on the target yaw rate $\gamma_{target}$, lateral acceleration calculating unit 40 may calculate a real-time target lateral acceleration $a_{y\text{-}demand}$ using Equation 2 below. That is, the lateral acceleration calculating unit 40 may calculate the real-time target lateral acceleration $a_{y\text{-}demand}$ of the vehicle using the real-time target yaw rate $\gamma_{target}{}^{real\text{-}time}$ that is calculated in real time during the running of the vehicle.

$$a_{y\text{-}demand} = V_x(\dot{\beta} + \dot{\gamma}_{target}{}^{real\text{-}time}) \qquad \text{Equation 2}$$

Here, $a_{y\text{-}demand}$ denotes the real-time target lateral acceleration, and $V_x$ denotes a vehicle speed in the x-axis direction. $\dot{\gamma}_{target}{}^{real\text{-}time}$ refers to a differential value of the real-time target yaw rate.

The control determination unit 50 may compare the real-time target lateral acceleration $a_{y\text{-}demand}$ calculated in the lateral acceleration calculating unit 40 with predetermined upper and lower limit threshold values of the lateral acceleration in order to thereby determine whether or not the driver intends to drive the vehicle by himself/herself.

The control determination unit 50 may have the information on the upper and lower limit threshold values of the lateral acceleration that is calculated by using Equation 3 below.

$$a_{y\text{-}Threshold\text{-}1} = a_{y\text{-}ref} + \alpha_1$$

$$a_{y\text{-}Threshold\text{-}2} = a_{y\text{-}ref} + \alpha_2 \qquad \text{Equation 3}$$

Here, $a_{y\text{-}Threshold\text{-}1}$ denotes an upper limit threshold value of the lateral acceleration, and $a_{y\text{-}Threshold\text{-}2}$ denotes a lower limit threshold value of the lateral acceleration. $a_{y\text{-}ref}$ refers to the target lateral acceleration, and $\alpha_1$ and $\alpha_2$ are constants to configure the upper limit threshold value $a_{y\text{-}Threshold\text{-}1}$ and the lower limit threshold value $a_{y\text{-}Threshold\text{-}2}$ of the lateral acceleration such that the lateral acceleration is included in a predetermined range of values.

The upper limit threshold value $a_{y\text{-}Threshold\text{-}1}$ and the lower limit threshold value $a_{y\text{-}Threshold\text{-}2}$ of the lateral acceleration are to be configured in consideration of a physical limit to the acceleration and deceleration of the vehicle. The physical limit of the acceleration and deceleration may include a maximum range of the acceleration and the deceleration of the vehicle according to the performance of the vehicle, a distance from the current position of the vehicle to the target point, road conditions depending on the weather, or the driver's mental stability.

In general, the maximum range of the acceleration and the deceleration of the vehicle may vary depending on the type and the manufacturing year of the vehicle, so it is desirable to take this into consideration. The distance from the current position of the vehicle to the target point is to be considered because the time to accelerate or decelerate the speed is different according to the distance to the target point. That is, in the case of a long distance, the optimum speed is adjusted to be close to the maximum allowable speed, whereas in the case of a short distance, the optimum speed is adjusted to be lower than the maximum allowable speed. The road conditions are to be considered because it is not easy to stop the vehicle or the vehicle tends to skid on rainy or snowy days. The driver's mental stability is to be considered because some drives may lose mental stability in the case of a sudden acceleration or deceleration of the vehicle or may be reluctant to do the same according to their disposition. Reflecting such driver's disposition, the optimal speed may be configured to be lower than the maximum allowable speed even in the case where the vehicle can be accelerated or decelerated to the maximum allowable speed.

The lateral acceleration of the vehicle may be configured not to exceed 0.3 g in consideration of the physical limit, and thus the constants $\alpha_1$ and $\alpha_2$ are configured such that the upper limit threshold value $a_{y\text{-}Threshold\text{-}1}$ and the lower limit threshold value $a_{y\text{-}Threshold\text{-}2}$ of the lateral acceleration do not exceed 0.3.

When the real-time target lateral acceleration $a_{y\text{-}demand}$, which is calculated in the lateral acceleration calculating unit 40, is provided, the control determination unit 50 may compare the real-time target lateral acceleration $a_{y\text{-}demand}$ with the upper limit threshold value $a_{y\text{-}Threshold\text{-}1}$ and the lower limit threshold value $a_{y\text{-}Threshold\text{-}2}$ of the lateral acceleration, and if the real-time target lateral acceleration $a_{y\text{-}demand}$ is greater than the upper limit threshold value $a_{y\text{-}Threshold\text{-}1}$ of the lateral acceleration or is less than the lower limit threshold value $a_{y\text{-}Threshold\text{-}2}$ of the lateral acceleration, the control determination unit 50 may determine that the driver intends to drive the vehicle by manipulating the steering wheel to thereby terminate the automatic driving mode for the automatic driving control of the vehicle so that the driver takes control of the vehicle to drive.

Figure 5:
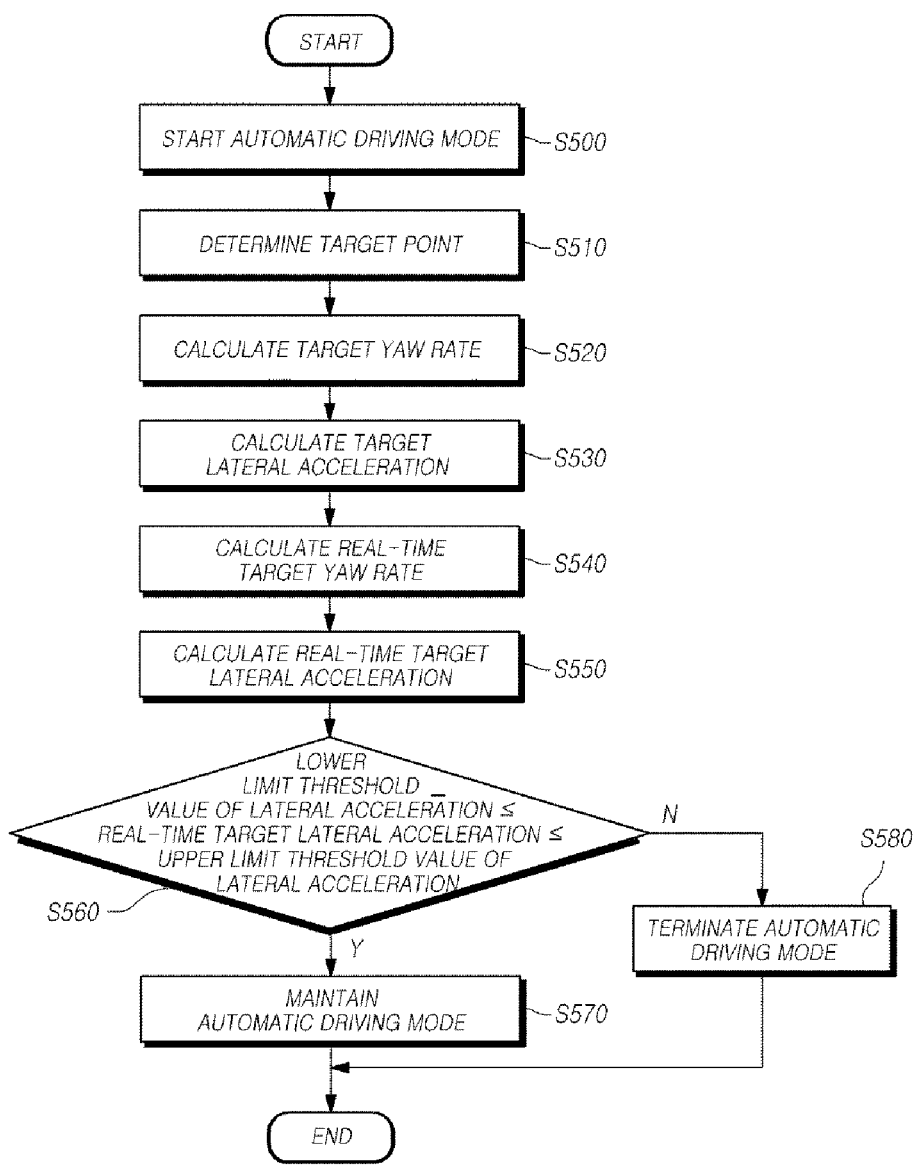
FIG. 5 is a flowchart illustrating the operation of recognizing the driver's intention by using the yaw rate and the lateral acceleration and controlling the automatic driving of the vehicle in the automatic driving controlling system of the present invention.

The operation of recognizing the driver's intention using the yaw rate and the lateral acceleration and controlling the automatic driving of the vehicle in the automatic driving controlling system 1 according to the configuration set forth above will be described with reference to FIG. 5.

The speed sensor 10 detects the speed in order to thereby create the speed information while the vehicle is traveling in the automatic driving mode (S500). When the target point is determined (S510), the yaw rate calculating unit 30 calculates the target yaw rate $\gamma_{target}$ that is required for driving the vehicle to the target point (S520).

The calculated target yaw rate $\gamma_{target}$ and the vehicle speed information are provided to the lateral acceleration calculating unit 40, and the lateral acceleration calculating unit 40 applies the target yaw rate $\gamma_{target}$ and the vehicle speed to Equation 1 to thereby yield the target lateral acceleration $a_{y\text{-}ref}$ (S530).

The yaw rate sensor 20 detects the yaw rate of the vehicle in real time while the vehicle is driving in the automatic driving mode based on the target lateral acceleration $a_{y\text{-}ref}$, and the yaw rate calculating unit 30 calculates the real-time target yaw rate $\gamma_{target}{}^{real\text{-}time}$ that is required in order for the vehicle to reach the target point by using the yaw rate detected by the yaw rate sensor 20 and the target yaw rate $\gamma_{target}$ (S540).

Then, the real-time target yaw rate and $\gamma_{target}{}^{real\text{-}time}$ and the vehicle speed detected in real time may be applied to Equation 3 in order to thereby yield the real-time target lateral acceleration $a_{y\text{-}demand}$ (S550).

When the real-time target lateral acceleration $a_{y\text{-}demand}$ is provided, the control determination unit 50 determines whether or not the real-time target lateral acceleration $a_{y\text{-}demand}$ is included in the range between the upper limit threshold value $a_{y\text{-}Threshold\text{-}1}$ and the lower limit threshold value $a_{y\text{-}Threshold\text{-}2}$ of the lateral acceleration (S560). As a result of the determination, if the real-time target lateral acceleration $a_{y\text{-}demand}$ is included in the range between the upper limit threshold value $a_{y\text{-}Threshold\text{-}1}$ and the lower limit threshold value $a_{y\text{-}Threshold\text{-}2}$ of the lateral acceleration, the control determination unit 50 determines that the vehicle is travelling under the automatic driving control along the configured trajectory and maintains the automatic driving mode (S570). On the contrary, if the real-time target lateral acceleration $a_{y\text{-}demand}$ is greater than the upper limit threshold value $a_{y\text{-}Threshold\text{-}1}$ of the lateral acceleration or is less than the lower limit threshold value $a_{y\text{-}Threshold\text{-}2}$ of the lateral acceleration, the control determination unit 50 determines that the driver intends to drive the vehicle by manipulating the steering wheel and releases the automatic driving mode (S580).

The automatic driving controlling system 1, according to the present invention, calculates, in real time, the real-time target yaw rate $\gamma_{target}^{real\text{-}time}$ to reach the target point, and calculates the real-time target lateral acceleration $a_{y\text{-}demand}$ by using the real-time target yaw rate $\gamma_{target}^{real\text{-}time}$ while the vehicle is driving in the automatic mode. Then, the automatic driving controlling system 1 may recognize the driver's intention for the driving control by using the real-time target lateral acceleration $a_{y\text{-}demand}$ so that the driver's intention for the driving control may be recognized more accurately. According to this, the driver may release the automatic driving mode at any time the driver desires while the active driving control mode is in progress to thereby enhance the convenience and satisfaction of the driver.

The standard description and the standard documents mentioned in the embodiments above are omitted to simplify the description of the specification, and may constitute a part of the present specification. Therefore, adding a part of the standard description and the standard documents to the present specification, or including the same in the claims, is to be interpreted to belong to the scope of the invention.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. An automatic driving controlling system comprising:
   a speed sensor that detects a vehicle speed;
   a yaw rate sensor that detects a yaw rate of the vehicle;
   a controller configured: to calculate a target yaw rate that is required to drive the vehicle to a target point and calculates a real-time target yaw rate that is required to drive the vehicle to the target point by comparing a yaw rate that is detected by the yaw rate sensor in real time with the target yaw rate;
   to calculate a target lateral acceleration that is required to drive the vehicle to the target point by using the vehicle speed and the target yaw rate, and calculates a real-time target lateral acceleration that is required to drive the vehicle to the target point by using the vehicle speed and the real-time target yaw rate; and
   to determine whether or not the real-time target lateral acceleration is out of a range between an upper limit threshold value and a lower limit threshold value of the target lateral acceleration while an automatic driving mode that automatically controls the driving of the vehicle is in progress,
   wherein the controller terminates, if the real-time target lateral acceleration is out of the range between the upper limit threshold value and the lower limit threshold value, the automatic driving mode for the automatic driving control of the vehicle so that the driver takes control of the vehicle to drive.

2. The automatic driving controlling system of claim 1, wherein the range between the upper limit threshold value and the lower limit threshold values is a predetermined value in consideration of a physical limit of the vehicle.

3. The automatic driving controlling system of claim 2, wherein the physical limit includes at least one of a maximum range of an acceleration and a deceleration of the vehicle, a distance between a position of the vehicle and the target point, and road conditions.

4. An automatic driving controlling method comprising:
   detecting, by a speed sensor, a vehicle speed;
   detecting, by a yaw rate sensor, a yaw rate of the vehicle;
   calculating, by a controller, a target yaw rate that is required to drive the vehicle to a target point;
   calculating, by the controller, a target lateral acceleration that is required to drive the vehicle to the target point by using the vehicle speed and the target yaw rate;
   controlling, by the controller, the driving of the vehicle according to the target lateral acceleration;
   calculating, by the controller, a real-time target yaw rate that is required to drive the vehicle to the target point by comparing a yaw rate that is detected in real time with the target yaw rate while an automatic driving mode for automatically controlling the driving of the vehicle is in progress;
   calculating, by the controller, a real-time target lateral acceleration that is required to drive the vehicle to the target point by using the vehicle speed and the real-time target yaw rate;
   determining, by the controller, whether or not the real-time target lateral acceleration is out of a range between an upper limit threshold value and a lower limit threshold value of the target lateral acceleration; and
   terminating, by the controller, if the real-time target lateral acceleration is out of the range between the upper limit threshold value and the lower limit threshold value, the automatic driving mode for the automatic driving control of the vehicle so that the driver takes control of the vehicle to drive.

5. The method of claim 4, wherein the range between the upper limit threshold value and the lower limit threshold values is a predetermined value in consideration of a physical limit of the vehicle.

6. The method of claim 5, wherein the physical limit includes at least one of a maximum range of an acceleration and a deceleration of the vehicle, a distance between a position of the vehicle and the target point, and road conditions.

* * * * *